United States Patent [19]

MacPherson et al.

[11] 3,758,213

[45] Sept. 11, 1973

[54] METHOD AND APPARATUS FOR TESTING FRONT WHEEL ALIGNMENT OF AUTOMOTIVE VEHICLES

[76] Inventors: Roger MacPherson, 148 Millbank St., Rochester, N.Y. 14619; Pierre A. Alsina, 3480 Elmwood Ave., Rochester, N.Y. 14618

[22] Filed: July 27, 1971

[21] Appl. No.: 166,392

[52] U.S. Cl. .............................. 356/155, 33/203.13
[51] Int. Cl. ............................................ G01b 11/26
[58] Field of Search ................... 356/155; 33/46 W, 33/203.13, 228; 73/117

[56] References Cited
UNITED STATES PATENTS

| | | | |
|---|---|---|---|
| 3,512,263 | 5/1970 | Hirmann | 33/203.13 |
| 3,546,782 | 12/1970 | Pereve et al. | 33/203.13 |
| 2,410,339 | 10/1946 | Creagmile | 356/155 |
| 3,439,987 | 4/1969 | Bacher et al. | 33/46 W |
| 3,501,240 | 3/1970 | Haynes | 356/155 |
| 2,755,554 | 7/1956 | MacMillan | 33/203.13 |
| 2,702,432 | 2/1955 | Martin | 73/117 |
| 2,583,201 | 1/1952 | Bennett | 73/117 |

*Primary Examiner*—Ronald L. Wibert
*Assistant Examiner*—Paul K. Godwin
*Attorney*—Shlesinger, Fitzsimmons & Shlesinger

[57] ABSTRACT

The front wheels of the vehicle are driven onto a pair of spaced, parallel rollers, one of which may be driven by an electric motor to effect rotation of the front wheels while the vehicle is standing motionless. The hubcaps are removed and a plane mirror is secured by a magnet to the hub of each front wheel to rotate therewith in a plane perpendicular to the associated spindle. A beam of light is shone onto each mirror through a small central hole in a chart that is positioned outwardly from the wheel, and this beam is reflected back onto the associated chart as a point of light which is offset horizontally and vertically from the hole in proportion to the toe and camber of the wheel. A removable fixture is provided for aligning the reference light beams and charts.

10 Claims, 7 Drawing Figures

3,758,213
PATENTED SEP 11 1973
SHEET 1 OF 3
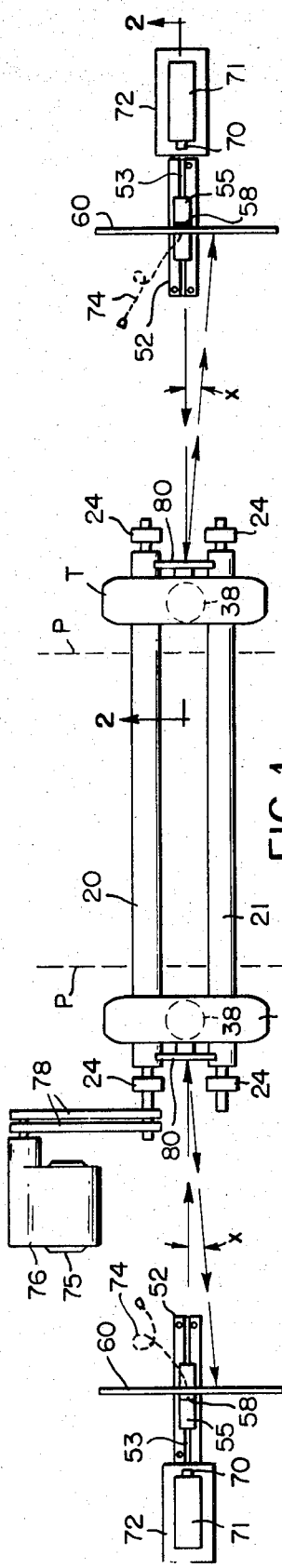
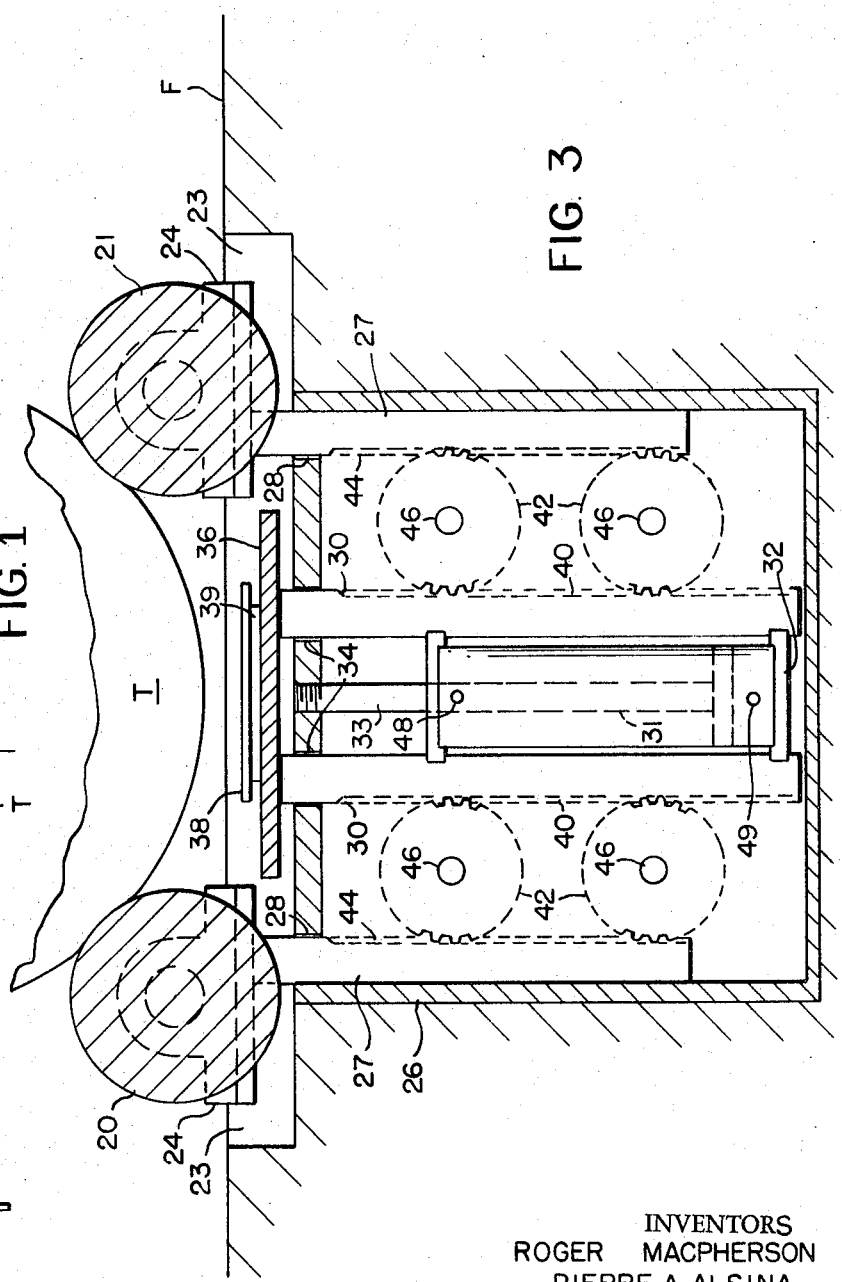
INVENTORS
ROGER MACPHERSON
PIERRE A. ALSINA
BY
Shlesinger, Fitzsimmons & Shlesinger
ATTORNEYS

INVENTORS
ROGER MACPHERSON
PIERRE A. ALSINA
BY
ATTORNEYS

INVENTORS
ROGER MACPHERSON
PIERRE A. ALSINA
BY
ATTORNEYS

METHOD AND APPARATUS FOR TESTING FRONT WHEEL ALIGNMENT OF AUTOMOTIVE VEHICLES

This invention relates to apparatus for testing the alignment of the front wheels of an automotive vehicle, and more particularly to apparatus which enables the front wheels of the vehicle to be rotated while the test is being conducted.

The front wheels of an automotive vehicle cannot properly be tested unless normal operating conditions of the vehicle are simulated during the test. In other words, during the test the vehicle's front wheels should be rotating, and the compression pressure on its tie rods should be the same as encountered when the vehicle is in motion. With most prior apparatus used for checking front wheel alignment, it has not been possible to simulate these conditions during the test. Consequently the results have not been accurate. Futhermore, prior equipment is usually expensive to install and rather difficult to operate.

It is an object of this invention to provide improved apparatus for accurately testing the alignment of the front wheels of an automotive vehicle while the wheels are loaded and rotated to simulate operation of the vehicle.

A further object of this invention is to provide improved testing apparatus of the type described, which is substantially less expensive to manufacture and easier to operate, than prior such apparatus. To this end it is an object of this invention to provide apparatus which requires little or no training to operate, and which can be mastered readily by a high school graduate.

A more specific object of this invention is to provide apparatus of the type described, which uses reflected beams of light to establish for each front wheel of a vehicle the angular offset of its axis of rotation relative to a reference axis common to the two front wheels of the vehicle.

Still another object of this invention is to provide apparatus of the type described which is operable only if properly calibrated, and if improperly calibrated will not produce any reading at all, thereby automatically indicating need for recalibration and preventing false or inaccurate readings.

Other objects of the invention will be apparent hereinafter from the specification and from the recital of the appended claims, particularly when read in conjunction with the accompanying drawings.

In the drawings:

FIG. 1 is a fragmentary plan view of apparatus made in accordance with one embodiment of this invention for testing the alignment of the front wheels of automotive vehicles;

FIG. 3 is a fragmentary sectional view on the same scale as FIG. 2, and taken along the line 3—3 in FIG. 2 looking in the direction of the arrows;

Figure 5:
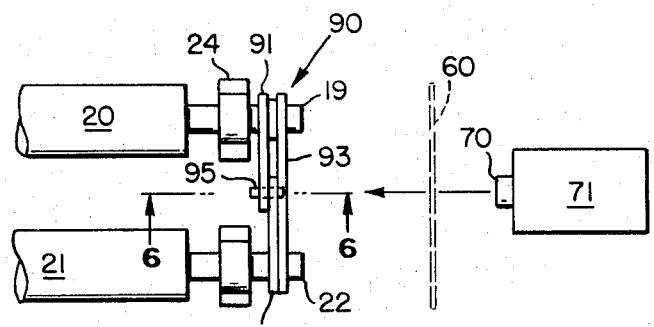
Figure 6:
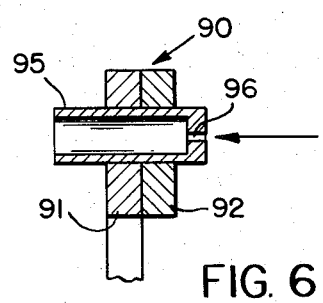
Figure 7:
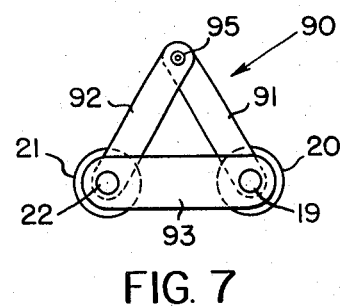

FIG. 5 is an enlarged, fragmentary plan view of part of the apparatus illustrated in FIG. 1, and showing part of a calibrating device t at can be employed for adjusting the alignment of the light sources and charts that are employed in the testing apparatus, FIG. 6 is a fragmentary sectional view taken along the line 6—6 in FIG. 5 looking in the direction of the arrows; and FIG. 7 is an end elevational view of this apparatus looking in FIG. 6 at the right end of the apparatus.

Referring now to the drawings by numerals of reference, 20 and 21 (FIGS. 1 and 3) denote a pair of spaced, parallel rollers, opposite ends of which are journaled in two pairs of laterally spaced pillow blocks 24, which support the rollers transversely across one end of a pit P (broken lines in FIG. 1) in the floor F of a garage or the like. At opposite sides of the pit each pair of blocks 24 is mounted for limited vertical adjustment in a shallow recess 23 in the floor F at one side of the pit.

Mounted in the floor F beneath each such recess is a housing 26. Two, spaced, parallel racks 27 are mounted in each housing 26 adjacent the front and rear ends thereof, respectively, for vertical sliding movement. They project through registering openings 28 in the top of the housing, and are fastened rigidly to the undersides of the two pillow blocks 24 that support the corresponding ends of rollers 20 and 21. Two further racks 30 are secured in each housing 26 at diametrally opposite sides of a cylinder 32, which is mounted for vertical reciprocation in the housing. A piston 31 in each cylinder 32 has an attached rod 33, which projects out of the upper end of the cylinder, and is threaded into the top of the associated housing 26. The racks 30 project at their upper ends slidably through openings 34 in the top of each housing 26, and are fastened to the underside of one of two spaced, horizontally disposed plates 36 (only one being shown in FIG. 2), which are disposed in the space between the rollers 20 and 21. Each plate 36 carries a circular tire pad 38, which is rotatable on a slide 39 which is manually adjustable slidably on plate 36 in a direction parallel to the axes of rolls 20 and 21. Pad 38 may be mounted by ball bearings on slide 39. The structure is conventional.

Each rack 30 has on its outer surface teeth 40, which mesh with vertically spaced pinions 42 that, in turn, mesh with the teeth 44 formed in the inside surfaces of the racks 27. The pinions 42 are secured to four, spaced, parallel shafts 46, which are journaled at opposite ends in opposite sides of each housing 26.

Each cylinder 32 has fluid inlet and outlet ports 48 and 49, which communicate with the cylinder interior at opposite sides, respectively, of its piston. When the motive fluid is fed to the port 48 of a cylinder 32 and exhausted from its port 49, the cylinder is driven upwardly relative to the associated piston, thus elevating the attached racks 30 and the tire pads 38, and through the gears 42, lowering the associated racks 27 and rollers 20, 21. Conversely, when the motive fluid is supplied to its port 49 and exhausted from its port 48, the cylinder 32 is driven downwardly, thus lowering the attached racks 30 and the plates 36 and 38 thereon, while simultaneously elevating the associated racks 27, the attached blocks 24, and the associated ends of the rollers 20 and 21.

Fastened to the floor F by screws 51 (FIGS. 2 and 4) at opposite ends, respectively, of the rollers 20 and 21 are two base plates 52 (FIG. 1). In its upper surface each plate 52 has a longitudinal groove 53, which extends parallel to the rollers 20 and 21, and which is bisected by a vertical plane through the midpoint of the space between rollers 20 and 21. Each of two further plates or slides 55, which are slidable on plates 53, has on its underside an integral, longitudinally extending key 56, which projects slidably into the groove 53 on the associated plate 52. Thus, plates 55 are guided for sliding movement toward and away from the ends of rollers 20 and 21.

Figure 2:
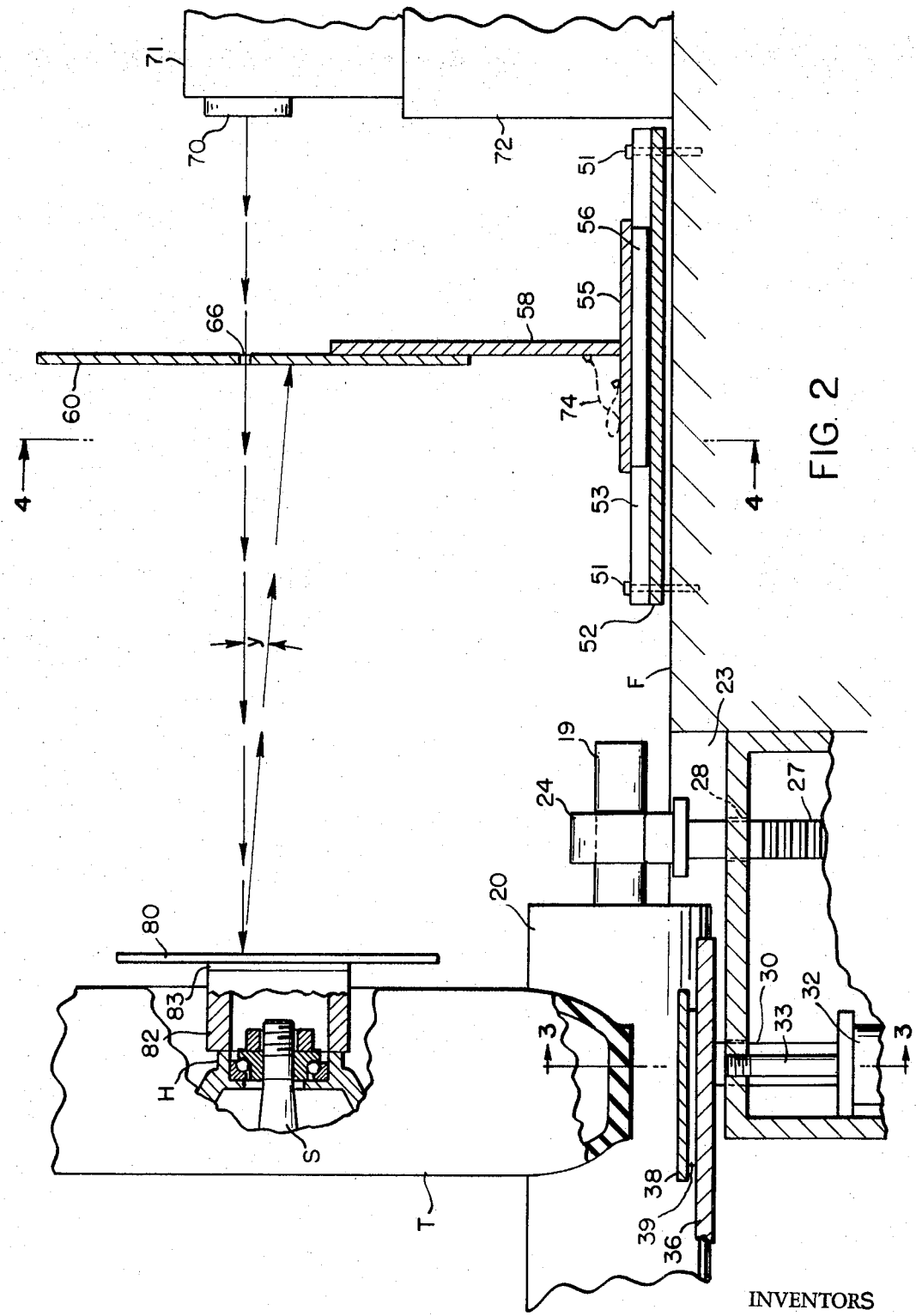
FIG. 2 is an enlarged, fragmentary, vertical sectional view taken generally along the line 2—2 in FIG. 1 looking in the direction of the arrows.
Figure 4:
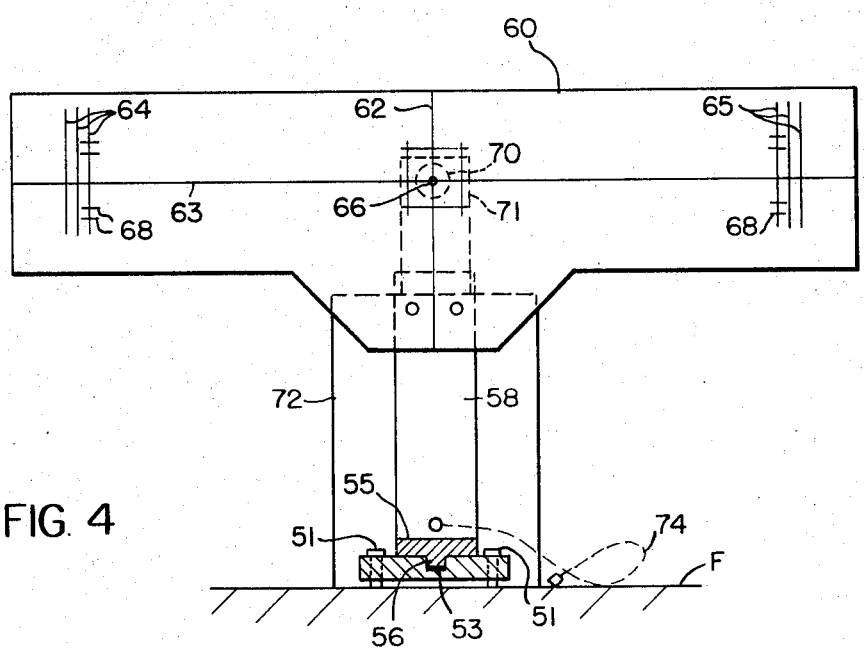
FIG. 4 is a fragmentary sectional view on a slightly smaller scale than FIG. 2, taken along the line 4-4 in FIG. 2 looking in the direction of the arrows.

Fastened to vertical plates 58 (FIGS. 2 and 4) carried by slides 55, and positioned to face the adjacent ends of rollers 21 and 22, are two, identical flat, plane charts 60 (FIGS. 1, 2 and 4). Medially of its ends the face of each chart 60 has a zero "toe" reference line 62 (FIG. 4), which lies in a vertical plane that extends centrally of the grooves 56 and of the space between rollers 20 and 21. Approximately medially of its upper and lower edges, each chart 60 also has on its face a zero "camber" reference line 63, which intersects the associated "toe" reference line 62 at right angles. Adjacent opposite ends thereof, respectively, each chart 60 also has on its face spaced, vertical reference lines 64 and 65, respectively, for checking the turning radius of a vehicle's front wheels; and disposed transversely of one or more of each set of reference lines 65 graduations 68 for reading caster.

At the intersection of its zero reference lines 62 and 63 each chart 60 has therethrough a small, circular hole 66 (FIs. 2 and 4), which registers with the head 70 of a light source 71, such as a laser that emits parallel light beams. Each source 71 is mounted on the upper end of a stand 72 that is fixed on floor F outwardly or rearwardly of each chart 60. Each light source 71 is positioned so that, when properly calibrated, its beam of light passes horizontally through the aperture 66 in the adjacent chart 60, and registers with the opening 66 in the opposite chart 60, and the head 70 of the other source 71.

Attached at one end to the face or each stand 72 is a cord or chain 74, which is used as described hereinafter to determine the proper lateral position of each chart 60 relative to the vehicle's wheels that are to be tested.

To enable the front wheels of a vehicle to be rotated during a test, an electric motor 75 is drivingly connected through a gear reducer 76 (FIG. 1) and pulleys (not illustrated) and belts 78 to one end of roller 20, so that when the motor is energized to drive roller 20, the rotation will be transmitted through the vehicle's tires T to the front wheels of the vehicle.

At the commencement of a test the tire pads 38 may be disposed in their elevated positions so that when the vehicle is driven onto the apparatus, its two front tires T will rest directly on the pads 38 between the rollers 20 and 21. After the tires T have come to rest on the pads 38, the system can be operated to drive the cylinders 32 downwardly to lower the pads 38, and elevate the blocks 24 until the rollers 20 and 21 engage and support the undersides of the two tires T as illustrated in FIG. 3.

At this time the hub caps and dust covers are removed from the front wheels of the vehicle to expose the hub portion H of each wheel. A first surface or polished aluminum mirror 80 (FIGS. 1 and 2) is then secured releasably to the outside of each front wheel by an annular magnet 82 (FIG. 2) so that the reflective surface of each mirror 80 confronts one of the charts 60. Each magnet 82 is secured at one end by a spacer ring 83 to the back of its associated mirror. Consequently, each mirror 80 is maintained in a plane normal to the axis of the spindle S (FIG. 2) upon which each wheel is mounted. The mirror stays in the normal plane irrespective of wobble of the wheel and tire.

After the mirrors 80 have been mounted on the wheels, the free end of each cord 74 is placed against the face of the adjacent mirror 80; and the slide 55 for the associated chart 60 is then adjusted either toward or away from the vehicle until the cord 74 is drawn taut. This positions each chart 60 a predetermined distance, based upon the pre-established length of each cord 74, from the reflecting surface of the associated mirror 80.

Assuming that the lasers 71 are properly positioned and energized, the coaxial reference beams of light therefrom will at this time shine horizontally through the openings 66 in the adjacent charts 60, onto the reflecting surfaces of the registering mirrors 80, and will be reflected back onto the graduated faces of the charts 60, as illustrated, for example, by the arrows in FIGS. 1 and 2. The electric motor, which drives the gear unit 76, is now energized, so that the roller 20 commences to rotate the two front wheels of the vehicle, and the mirrors 80. Since the reflecting surface of each mirror 80 rotates in a plane, the laser beam reflected from each mrrror 80 forms a stationary point of light on the surface of each chart 60.

If at this time the two front wheels rotated coaxially of one another, i.e. with no camber or toe, then the reflected beams would be coaxial of the laser heads 70, and would be reflected back through the openings 66 in charts 60. However, since the front weeels of an automotive vehicle are designed to rotate with camber and toe-in, each reflected beam will be inclined at an angle to the reference beam. Moreover, since the axis of each turning spindle S is normal to the relecting surface of the associated mirror 80, the angle of incidence for each beam of light striking a mirror 80 will be equivalent to the angular offset of the spindle axis from the reference beam. In other words, to the extent thathe front wheels toe in, and have camber, the reflected light beams are angularly offset horizontally and vertically from the originating or reference beams as illustrated, for example, by the angles x and y in FIGS. 1 and 2, respectively.

The face of each chart 60 is provided with a plurality of vertical and horizontal graduations or spaced lines (not shown) positioned at opposite sides, respectively, of the zrro reference lines 62 and 63. The face of each chart can be calibrated, in fact, so that an operator can read at the same time in degrees, for example, the toe and camber in both wheels that are being tested, depending upon the distance that the spot of light that is formed by the reflected beam on a chart surface, is offset horizontally and vertically, respectively, from the center opening 66 at the intersection of lines 62 and 63. For these readings to be accurate, of course, each chart 60 must be located always the same distance from the associated mirror 80, when a reading is being taken. For this reason the cord 74, which is of predetermined length, is used when the chart 60 must be moved inwardly or outwardly to accommodate vehicles having larger or smaller wheel bases.

After the particular camber and toe of each front wheel of a vehicle has been determined, a mechanic can make, while the wheels are turning, whatever adjustments may be necessary in order to correct the camber and/or toe of the front whels. Aftr the toe and camber are corrected, the tire pads 38 may be elevated once again beneath the tires T. Then the steering wheel of the vehicle can be manipulated to turn the tires in opposite directions while the lasers 71 are energized, thus causing the reflected beams to traverse the faces of charts 60 from one end to the other so that thr turning radius of the front wheels can be checked against the graduations 64 and 65 located at opposite ends of the charts. Thereafter the vehicle may be driven ahead or backed off the rollers 20 and 21, and the apparatus is ready to conduct tests on other vehicles.

Caster is measured by placing the front wheels of the car on the swivel plates 38 after adjustment of these plates laterally to fit the width of the car. The front tires of the car are positioned exactly in the centers of the swivel plates when the rollers are retracted. Caster is measured by turning the wheels through equal angles in both directions. The graduations 68 are for measuring caster. Caster is read at the same time the turning radius is checked.

From the foregoing it will be apparent that the instant invention provides extremely simple and reliable apparatus for accurately checking the alignment of the front wheels of automotive vehicles. By rotating the front wheels of the vehicle during the test, the wheels are made to assume, between the rollers 20 and 21, the exact positions the tires would assume when the vehicle is in use. The parallel rollers position the car in three dimensions automatically, when the rollers are actuated, viz., horizontally, vertically and laterally. This is regardless of the initial position of the wheels on the rollers. As soon as the rollers are put in motion the car will seek and attain the same position it would have on the road if unrestrained by the driver of the vehicle. The reason for this phenomena is that for any geometric set-up of the front end of the car, i.e. for any combination of caster, camber, and toe-settings, the weight of the car will always make the car seek its lowest position relative to the rollers, and the wheels will consequently always assume a position which is determined by the caster, camber, and toe-settings. This machine, due to this phenomena, will always produce the same reading exactly of wheel alignment of a car irrespective of the lateral angle at which the car is put on the rollers. As soon as the rollers are actuated, the front end of the car will move back and forth laterally until it finds the balanced position of the total front wheel geometry.

The mirros 80, in cooperating with the charts 60, enable the operator to read directly on a chart 60 the exact toe and camber that each front wheel exhibits during rotation. However, unless the lasers 71 and charts 60 are properly mounted at the site of a test (i.e., the light beams from the lasers 71 are disposed coaxially of one another and register exactly with the centers of the openings 66 in the charts 60), the operator will not be able to read any reflected light beams, because in order for a beam of light to be projected onto a mirror 80, the adjacent laser 71 must be exactly aligned with the opening 66 in the associated chart 60. This feature is a major advantage, since it precludes the operator from conducting a test unless the equipment is properly set up. If the chart or laser is out of line, no light is reflected.

A further feature resides in the fact that there is no need to make any vertical adjustment in the charts 60 or lasers 71 to compensate for automobiles of different wheel heights, because angle y (angular offset from the horizontal) will be the same for a given wheel regardless of whether the reference beam strikes mirror 80 adjacent its upper edge, its lower edge, or medially of these two edges, It is essential, however, that each beam from a laser 71 be maintained in horizontal alignment with the opening 66 in the associated chart 60.

In order properly to mount the lasers 71 and charts 60 in operative relation to one another and to the rollers 20 and 21, a pair of mounting fixtures of the type illustrated generally at 90 in FIGS. 5 to 7 may be employed. Each fixture 90 comprises three, rigid links 91, 92 and 93, which have circular openings in opposite ends thereof. At one end of rollers 20 and 21 the links 91 and 92 of one fixture 90 are removably and pivotally mounted on roller extensions 19 and 22, respectively, to project above the rollers, and opposite ends of the associated link 93 are removably mounted on the same reduced-diameter extensions 19 and 22. Removably mounted in registering openings in the upper ends of the links 91 and 92 of this fixture is a small, tubular pin 95, which has at one end an axially extending fine opening 96. Links 91, 92 and 93 are equal in length, so that the bore 96 in pin 95 will be disposed medially of the space between the rollers 20 and 21. When a similar fixture 90 is mounted on the opposite ends of the rollers 20 and 21, the axial bore 96 of its pin 95 will register coaxially with the first-named bore 96 (FIG. 6).

After the two fixtures 90 have been mounted on the ends of the rollers 20 and 21, the lasers 71 are mounted on the supports 72 so that the beams thereof extend through the registering openings 96 in the pins 95. The charts 60 are then positioned so that the openings 66 therein register with the beams from the lasers 71. If a chart 60 is slightly offset from its proper position, it will prevent light from the adjacent laser 71 from passing through its central opening 66; and, conversely, if the adjacent laser 71 is not properly positioned, it will fail to shine light properly through line opening in the adjacent chart 60 and into the associated pin 95. After the lasers 71 and chart 60 have been properly positioned, as indicated by the projection of light through the registering bores 96 in the pins 95, the fixtures 90 may be removed from the rollers 20 and 21 and stored until it becomes necessary to recalibrate or readjust the lasers 71 and/or the charts 60.

The machine of this invention has many outstanding advantages in addition to those mentioned above, over conventional, prior apparatus for testing the front wheel alignment of automotive vehicles. Camber and toe can be read simultaneously on both wheels irrespective or wobble since this machine aligns the front wheel spindles of the car. The machine is a direct reading machine; there is no need for magnifying readings; and no error is introduced into the system. If the front wheels of a vehicle are parallel but tend to run at an angle to the forward vehicle direction, the machine will show this. This machine can show how the front wheel alignment changes for drivers of different weights; and when this is known, the weight factor can be compensated for for a particular vehicle. The machine is ideal for diagnostic work. The machine is a drive-through machine; it is not necessary to back the vehicle off the rollers after a test has been completed; the vehicle can simply be driven ahead and away.

While the invention has been described in connection with a specific embodiment thereof, it will be understood tha it is capable of further modification; and this application is intended to cover any improvements or modifications as come within the scope of the invention or the limits of the appended claims.

Having thus described our invention, what we claim is:

1. A method for simultaneously checking the alignment of the front wheels of an automotive vehicle, comprising
   positioning the vehicle so that its wheels, with the weight of the vehicle thereon, are disposed to rotate on their turning spindles between a pair of spaced targets that are disposed at opposite sides of the vehicle confronting the wheels,
   mounting a reflective surface on each wheel in a plane perpendicular to the axis of rotation of the wheel about its turning spindle and in confronting relation to the two targets, respectively,
   rotating said front wheels simultaneously about their respective turning spindles, and
   while said wheels are rotating, simultaneously projecting beams of light through axially aligned openings in the two targets onto the confronting reflective surfaces, respectively, to be reflected thereby back onto said targets.

2. Apparatus for simultaneously checking the alignment of the front wheels of an automotive vehicle, comprising
   a pair of spaced targets, each having an opening therethrough,
   a pair of spaced parallel rollers for suppporting the two front wheels of a vehicle for rotation about their respective spindles between said targets while the vehicle is motionless, and with the weight of the vehicle resting on said wheels,
   means for simultaneously rotating said rollers to effect simultaneous rotation of said front wheels,
   means for releasably mounting a reflective surface on each of said wheels for rotation thereby in confronting relation to one of said targets, and
   a pair of light sources for simultaneously projecting parallel beams of light horizontally through the openings in said targets and onto said reflective surfaces for reflection thereby onto said targets.

3. Apparatus for checking the alignment of the front wheels of an automotive vehicle comprising
   a pair of spaced targets, each having an opening there-through,
   means for rotating the to front wheels of a vehicle between said targets while the vehicle is motionless,
   means for releasably mounting a reflective surface on each of said wheels for rotation thereby in confronting relation to one of said targets, and
   a pair of light sources for projecting parallel beams of light horizontally through the openings in said targets and onto said surfaces for reflection thereby onto said targets,
   said rotating means comprising a pair of spaced, parallel rollers for rotatably supporting the two front wheels of a vehicle, and
   each of said targets being mounted for reciprocable adjustment parallel to said rollers.

4. Apparatus as defined in claim 2, wherein
   each of said targets has on its face a horizontal reference line corresponding to zero camber for a wheel, and a vertical reference line intersecting said horizontal reference line and corresponding to zero toe for a wheel, and
   said opening in each of said targets registers with the intersection of said reference lines.

5. Apparatus for checking the alignment of the front wheels of an automotive vehicle, comprising
   a pair of spaced, confronting targets having therethrough registering central openings,
   a pair of spaced light sources mounted adjacent said targets to project horizontal beams of light coaxially through said openings and toward one another,
   a pair of spaced, parallel, horizontally disposed rollers rotatably mounted between said targets to support the two front wheels of a vehicle, and
   means for releasably attaching a reflecting member to each of said wheels to reflect said beams of light onto the confronting faces of said targets to determine the camber and toe of said wheels.

6. Apparatus as defined in claim 5, including
   means for mounting said light sources so that the horizontal beams therefrom lie in a vertical plane that bisects the space between said rollers, and
   means mounting said targets for reciprocable horizontal adjustment toward and away from the adjacent ends of said rollers while maintaining the central openings therein coaxial of said beams.

7. Apparatus as defined in claim 5, wherein
   each of said targets has on its face a horizontal reference line corresponding to zero camber for a wheel, and a vertical reference line intersecting said horizontal reference line and corresponding to zero toe for a wheel, and
   said opening in each of said targets registers with the intersection of said reference lines.

8. Apparatus as defined in claim 7, having also vertical graduations, disposed at opposite sides of said vertical reference line, for measuring the turning radius of the front wheels of the vehicle.

9. Apparatus as defined in claim 8, having additionally horizontal graduations, which intersect the last-named vertical graduations, for measuring the caster of the wheels.

10. A device for calibrating front wheel alignment apparatus of the type including a pair of spaced, parallel rollers for rotatably supporting the front wheels of a vehicle between a pair of spaced targets, and spaced light sources disposed to direct coaxial beams of light through registering openings in said targets toward said wheels, comprising
    a pair of fixtures releasably attachable to opposite ends, respectively, of said rollers, and having therein registering openings disposed to be positioned coaxially of a horizontal axis located medially of the space between said rollers, when said fixtures are attached thereto, whereby said registering openings in said fixtures properly align the openings in said targets with the beams from said light sources, and vice versa, properly to calibrate the apparatus.

* * * * *